US008896701B2

(12) United States Patent
Brown et al.

(10) Patent No.: US 8,896,701 B2
(45) Date of Patent: Nov. 25, 2014

(54) INFRARED CONCEALED OBJECT DETECTION ENHANCED WITH CLOSED-LOOP CONTROL OF ILLUMINATION BY.MMW ENERGY

(75) Inventors: Kenneth W. Brown, Yucaipa, CA (US); David R. Sar, Corona, CA (US); James R. Gallivan, Pomona, CA (US); Wilkie M. Phillips, Rancho Cucamonga, CA (US)

(73) Assignee: Raytheon Company, Waltham, MA (US)

( * ) Notice: Subject to any disclaimer, the term of this patent is extended or adjusted under 35 U.S.C. 154(b) by 810 days.

(21) Appl. No.: 12/711,062

(22) Filed: Feb. 23, 2010

(65) Prior Publication Data

US 2011/0205367 A1 Aug. 25, 2011

(51) Int. Cl.
*H04N 5/33* (2006.01)
*H04N 5/225* (2006.01)

(52) U.S. Cl.
CPC .............. *H04N 5/33* (2013.01); *H04N 5/2256* (2013.01)
USPC ........... 348/164; 348/165; 348/166; 348/167; 348/168

(58) Field of Classification Search
CPC .......... H04N 5/33; H04N 5/332; H04N 3/09; G01J 5/02; G01J 2005/0077
USPC ..................... 348/160, 164; 280/735; 396/14; 340/567; 250/330, 338.1; 342/22, 52; 374/130; 382/124
IPC ............ G08B 13/18; B60R 21/015; H04N 5/33
See application file for complete search history.

(56) References Cited

U.S. PATENT DOCUMENTS

| 4,005,289 | A | 1/1977 | Del Grande | |
| 6,204,762 | B1 | 3/2001 | Dering | |
| 6,242,740 | B1 | 6/2001 | Luukanen | |
| 6,252,558 | B1 | 6/2001 | Brown | |
| 6,343,534 | B1 | 2/2002 | Khanna | |
| 6,753,529 | B2 | 6/2004 | DiMarzio | |
| 6,888,956 | B2 * | 5/2005 | Muramatsu et al. | 382/124 |
| 6,967,612 | B1 | 11/2005 | Gorman | |
| 7,126,477 | B2 * | 10/2006 | Gallivan et al. | 340/567 |
| 7,157,714 | B2 | 1/2007 | Del Grande | |
| 7,238,940 | B1 * | 7/2007 | Davidson et al. | 250/330 |
| 7,239,974 | B2 * | 7/2007 | Gulati | 702/131 |
| 7,490,538 | B2 | 2/2009 | Lowell | |

(Continued)

OTHER PUBLICATIONS

Ricahrd F. Hubbard, Long-Range Thermal Imaging Using a Millimeter-Wave Source, Office of Naval Research, NRL/NRC Research Associate, Downloaded Aug. 1, 2009, IEEE Xplore.

(Continued)

*Primary Examiner* — Thao X Le
*Assistant Examiner* — Long Le

(57) ABSTRACT

An active infrared sensor may include an imaging infrared sensor to provide an output signal conveying time-sequential infrared images of a scene which includes a subject, a beam generator to generate a millimeter wave energy beam, and a processor. An initial infrared image of the scene may be stored in a memory. After storing the initial infrared image, the beam generator may illuminate the subject with the millimeter wave energy beam. A temperature change across the subject due to the millimeter wave energy beam may be estimated based on the output signal and the stored initial infrared image. The beam generator may stop illuminating the subject when a highest temperature change across the subject is at least equal to a predetermined temperature change limit.

21 Claims, 9 Drawing Sheets

(56) References Cited

U.S. PATENT DOCUMENTS

| | | |
|---|---|---|
| 7,629,918 B2 | 12/2009 | Brown et al. |
| 7,784,390 B1 | 8/2010 | Lowell |
| 7,795,583 B1 * | 9/2010 | Hubbard et al. ............ 250/338.1 |
| 2004/0081221 A1 * | 4/2004 | Sandvoss ....................... 374/130 |
| 2006/0251408 A1 * | 11/2006 | Konno et al. .................... 396/14 |
| 2007/0035114 A1 * | 2/2007 | Breed et al. .................... 280/735 |
| 2007/0075246 A1 * | 4/2007 | Gatt ............................ 250/341.6 |
| 2007/0122038 A1 * | 5/2007 | Gorian et al. ................. 382/195 |
| 2008/0129581 A1 * | 6/2008 | Douglass et al. ................ 342/52 |
| 2008/0309544 A1 | 12/2008 | Diyankov |
| 2010/0214150 A1 * | 8/2010 | Lovberg et al. ................. 342/22 |

OTHER PUBLICATIONS

Raytheon, Silent Guardian Protection System, Less-than-Lethal Directed Energy Protection, PR 210065, 2006-2007, RMS Oct. 2007 4K 70532R, Tucson, AZ, USA.

* cited by examiner

INFRARED CONCEALED OBJECT DETECTION ENHANCED WITH CLOSED-LOOP CONTROL OF ILLUMINATION BY MMW ENERGY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to sensor systems for detecting concealed objects and particularly to systems that use an infrared sensor in combination with a millimeter wave illumination source.

2. Description of the Related Art

Passive video and infrared sensor systems typically capture images of scenes or subjects using natural or ambient illumination. Such sensors can capture high resolution images, but do not have the ability to detect concealed objects, such as weapons and explosive devices hidden beneath a person's clothing. Active sensors, such as microwave radar systems, may have the ability to penetrate clothing, but generally do not provide sufficient image resolution to attempt to identify specific concealed objects.

An active infrared sensor system is, to some extent, a hybrid of an infrared sensor and a radar system. An active infrared sensor uses an infrared sensor to detect localized temperature variations induced when a subject is illuminated by an electromagnetic energy source. Active infrared sensors using high power microwave illumination have been proposed for detecting buried objects such as land mines (see, for example, U.S. Pat. No. 6,343,534 B1; U.S. Pat. No. 6,753,529 B2). Active infrared sensing using millimeter wave illumination has also been proposed for longer range applications which may include concealed object detection (Hubbard et al., *Long-Range Thermal Imaging Using A Millimeter-Wave Source*, 33$^{rd}$ International Conference on Plasma Science, Jun. 4-8, 2006).

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
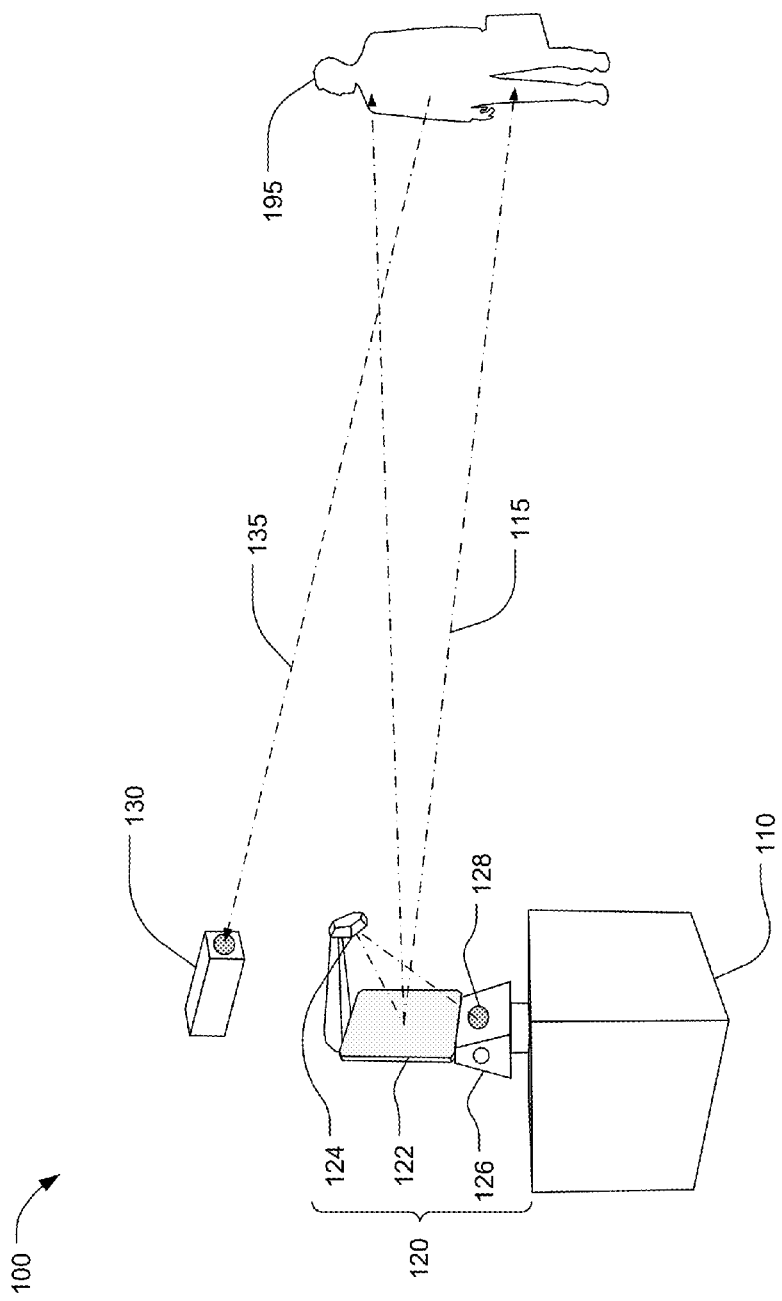
FIG. 1 is a schematic illustration of an active infrared sensing system

Referring now to FIG. 1, an active infrared sensing system 100 may include a millimeter wave energy source 110, a beam director 120 to form millimeter wave energy from the source 110 into a millimeter wave beam 115 to illuminate a subject 195, and an infrared sensor 130 to capture time-varying images of the subject as the subject is heated by the millimeter wave beam 115. The infrared sensor 130 may capture infrared energy 135 radiated from the subject 195 and a surrounding scene (not shown). The infrared energy 135 may have a much shorter wavelength than the millimeter wave energy 115, such that the infrared sensor 130 may resolve image details much smaller than the size of the millimeter wave beam 115.

The millimeter wave energy source 110 and beam director 120 may be, or be similar to, a Raytheon Company Silent Guardian system. The millimeter wave energy source 110 and beam director 120 may be a man-portable system such as that described in U.S. Pat. No. 7,490,538. The beam director 120 may include, for example, a waveguide 128, a primary reflector 122, and a secondary reflector 124 that collectively couple millimeter wave energy from the source 110 into the millimeter wave beam 115. The primary reflector 122 and secondary reflector 124 may be mounted on a pointing mechanism 126 such that the millimeter wave beam can be directed to a specific designated subject 195.

The infrared sensor 130 may be coupled to the pointing mechanism 126, or may have an independent pointing mechanism (not shown) such that a field of view of the infrared sensor 130 may always coincide with the subject illuminated by the millimeter wave beam 115. For example, the infrared sensor 130 may be mounted to the pointing mechanism 126 behind the primary reflector 122 and may view the subject 195 through a small aperture in the primary reflector 122.

In operation, the infrared sensor 130 may capture a first image of the subject 195 before the subject has been illuminated with millimeter wave energy. The infrared sensor 130 may subsequently capture one or more additional images of the subject 195 after the subject has been illuminated with the millimeter wave beam 115. Since the subject's clothing may be essentially transparent to the millimeter wave beam 115, the difference between the first and subsequent images may be indicative of how objects beneath the subject's clothing absorbed and/or reflected the millimeter wave energy in the millimeter wave beam 115 and subsequently heated the subject's clothing.

Figure 2:
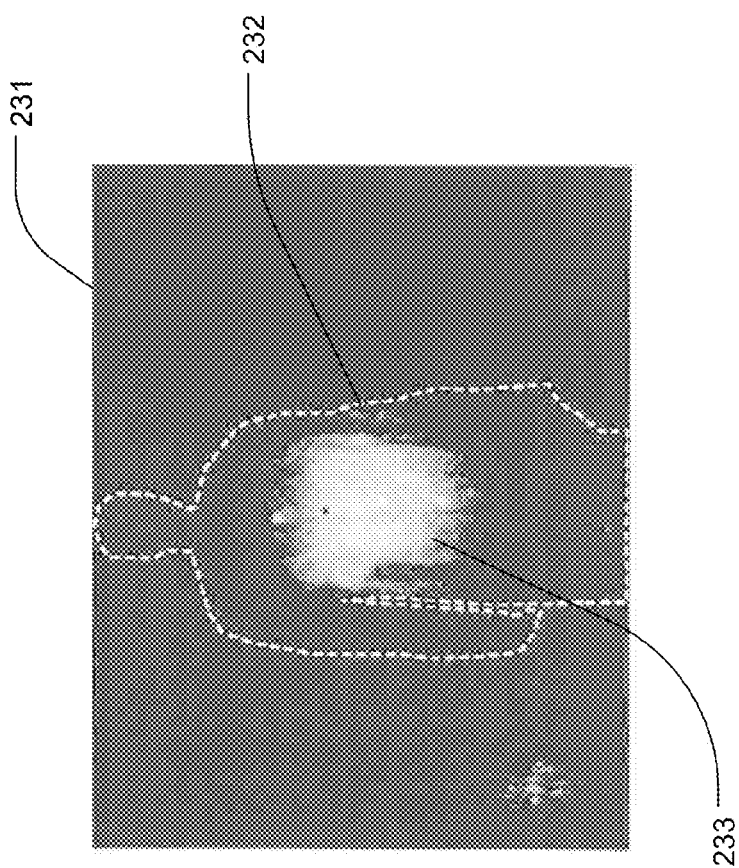
FIG. 2 is an exemplary image from a laboratory test of an active infrared sensing system.

FIG. 2 is an exemplary result from laboratory testing of an active infrared sensor system. FIG. 2 shows an image 231 of a mannequin indicated by the dashed line 232. The mannequin was wearing a trench coat and had a simulated IED (improvised explosive device) consisting of a thin clay slab filled with nails concealed under the coat. The image 231 shows the difference between infrared images of the subject captured before and after illumination with a 1000-watt millimeter wave beam for one second. In this example, the simulated IED is clearly detectable under the coat. Note that the bright portion 233 of the image 231 does not show the concealed object directly, but rather indicates a warm region on the surface of the concealing clothing caused by millimeter wave energy being absorbed and/or reflected by the underlying concealed object differently than by the subject's skin.

The power and duration of millimeter wave illumination required to make a concealed object visible in an infrared image may depend on a plurality of factors including the type of concealed object and the clothing or material concealing the object; the distance to the subject; the power and size of the millimeter wave illumination beam; the sensitivity, wavelength, bandwidth, and resolution of the infrared sensor; and atmospheric conditions such as humidity and precipitation. However, since a finite time may be required for a concealed object to absorb and/or reflect millimeter wave energy and then heat the overlying clothing, an illumination time of about one second or longer may be required independent of the illumination beam power.

Figure 3:
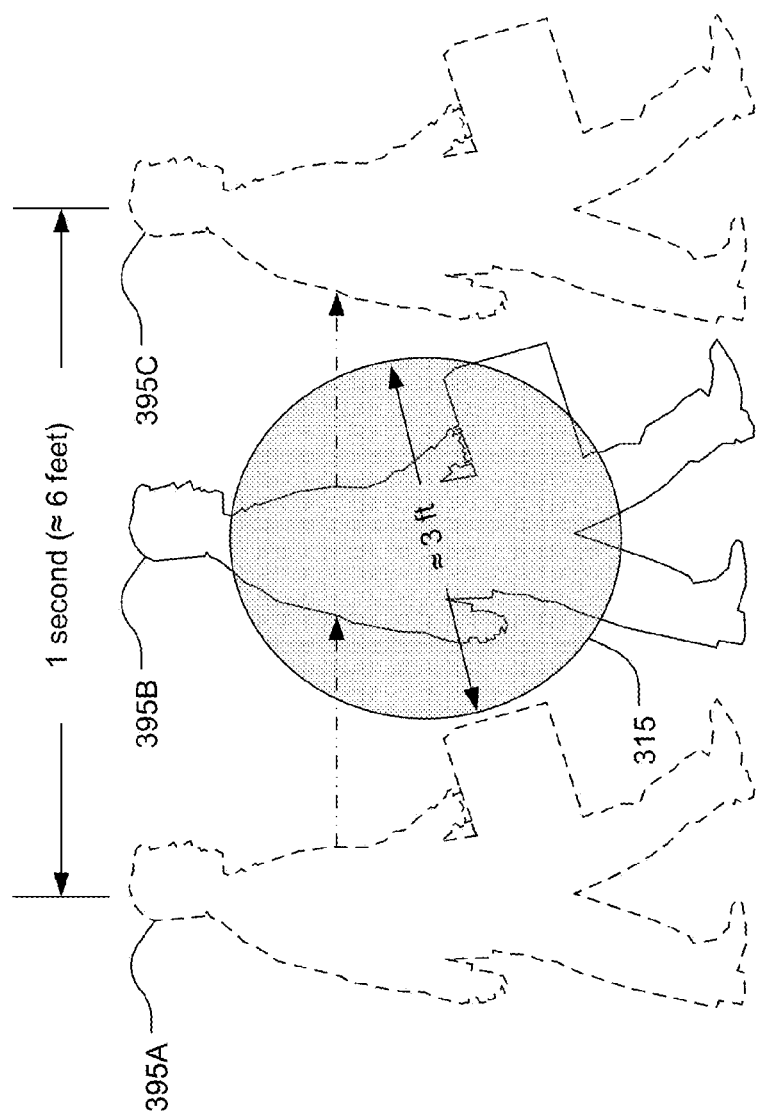
FIG. 3 is a schematic illustration of a moving subject.

The cost and energy expenditure of an active infrared imaging system for concealed object detection may be highly dependent on the total millimeter wave illumination power required. To make efficient use of the available millimeter wave illumination power, the cross-sectional area of the illumination beam may be restricted to a size sufficient to illuminate a single selected subject. For example, as shown in FIG. 3, the illumination beam 315 may be about three feet in diameter at a nominal working distance from the active infrared imaging system. Other beam sizes and formats, such as an oval beam three to five feet in height and two to three feet in width may also be used. The illumination beam cross-sectional area may vary with distance from the active infrared imaging system.

When the cross-sectional area of the illumination beam 315 is limited, as shown in FIG. 3, a moving subject may pass completely through the illumination beam 315 in less time than the illumination time required to detect a conceal object. For example, FIG. 3 illustrates a subject 395A-395C moving at a brisk walking pace of 4 miles per hour or about 6 feet per second.

Figure 4:
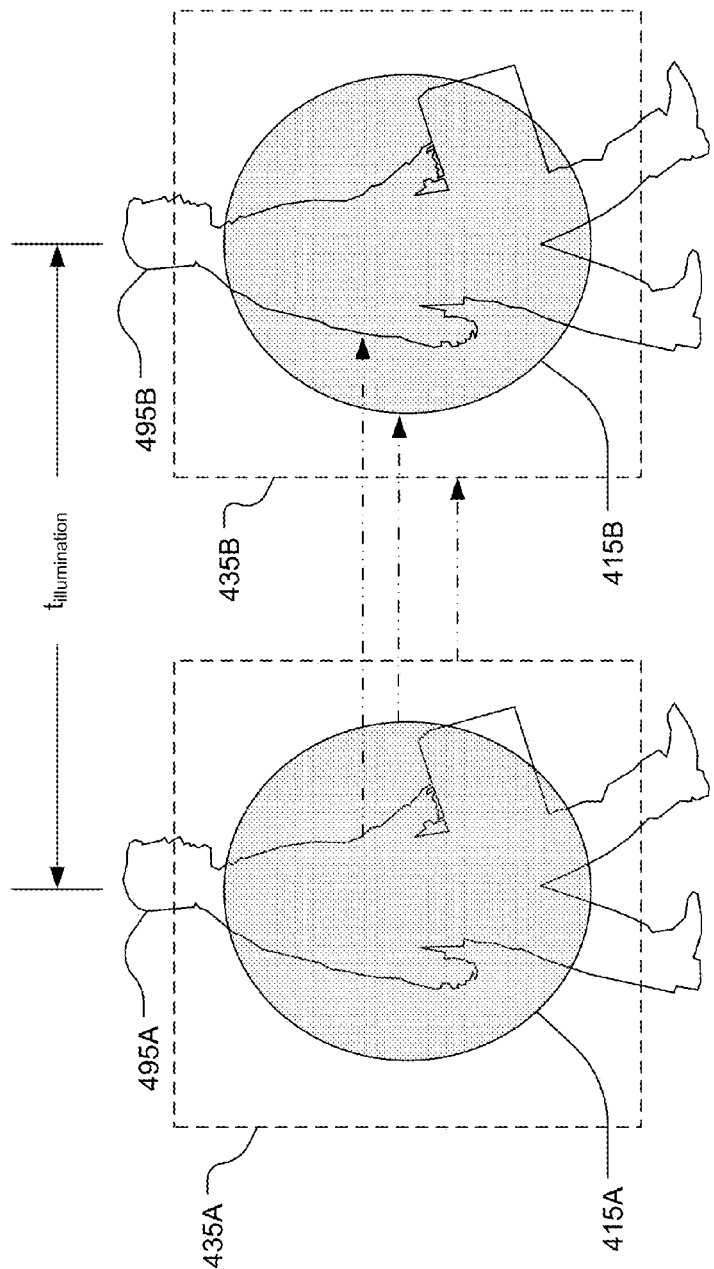
FIG. 4 is a schematic illustration of a tracked subject.

In order to illuminate a moving subject sufficiently to detect a concealed object, the millimeter wave illumination beam may track the subject as shown in FIG. 4. As the subject moves from position 495A to position 495B, the illumination beam may correspondingly move from position 415A to position 415B. When an active infrared imaging system is hand-held, the illumination beam may be caused to track a subject by virtue of an operator manually aligning a sight or other pointing device on the subject. When an active infrared imaging system is not hand-held, the illumination beam may be made to track the subject by an automated pointing mechanism responsive to an automatic subject tracker.

Referring back to FIG. 2, the image 231 is the difference between two images of a stationary mannequin taken with a stationary sensor before and after illumination with millimeter wave radiation. Since the mannequin and the sensor are both stationary, the difference between the two images may be predominantly due to heating by the millimeter wave radiation. However, two images of a moving subject, taken at different times, may include differences due to the motion of the subject. To emphasize differences due to heating by the millimeter wave illumination, the difference due to subject motion may be compensated to some extent.

Referring back to FIG. 4, image changes due to subject motion may be compensated, at least partially, if the infrared image sensor tracks the subject such that the subject 495A, 495B remains at fixed position, for example the center, within a field of view 435A, 435B of the image sensor. The field of view 435A, 435B shown in FIG. 4 is exemplary and the field of view of an actual infrared images sensor may be substantially larger than the cross-sectional area of the illumination beam 415A, 415B. The infrared image sensor may track the subject using the same mechanism that causes the illumination beam to track the subject. For example, when the active infrared imaging system is hand-held, the infrared sensor may be physically attached to, and aligned with, the millimeter wave illumination source. When the illumination beam is made to track the subject by an automated pointing mechanism responsive to an automatic subject tracker, the same automated system may cause the infrared image sensor to track the subject.

Figure 5:
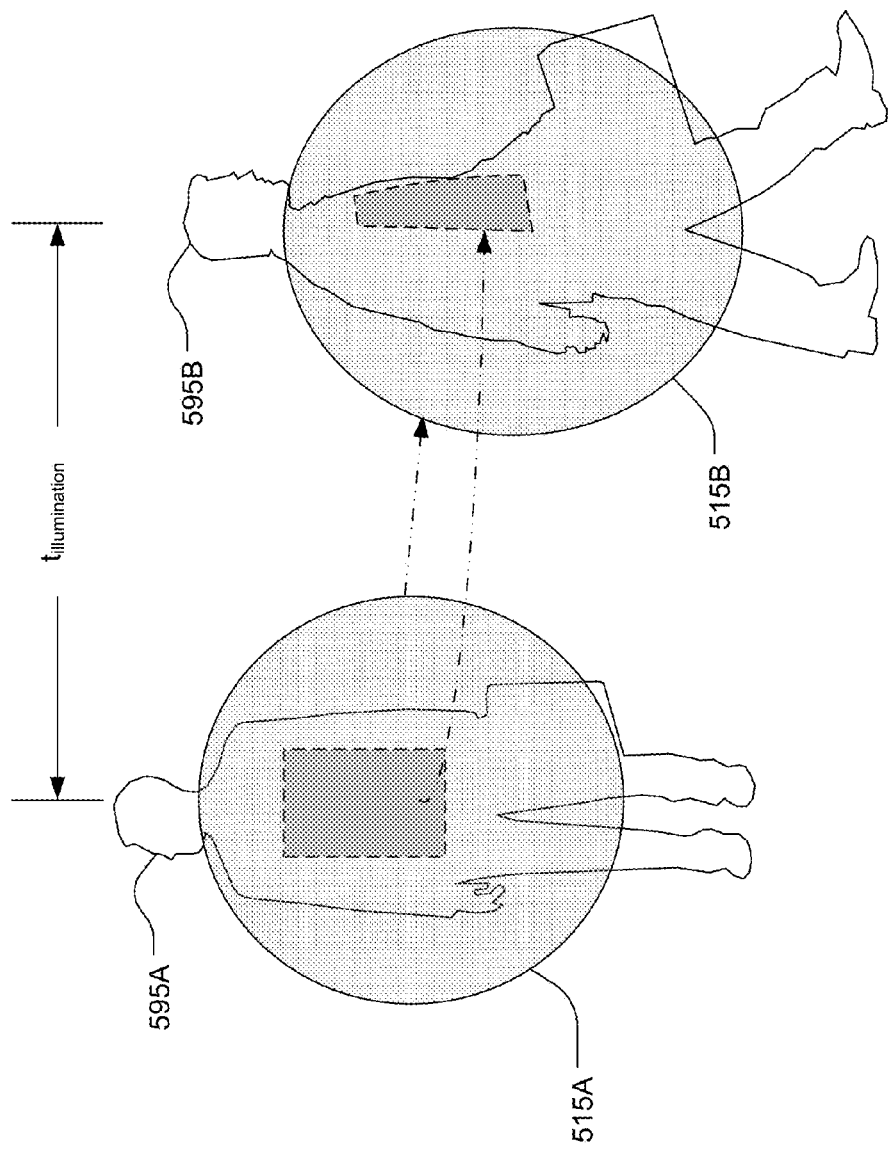
FIG. 5 is a schematic illustration of a subject with changing aspect.

When either a manual or automated system is used to track a subject, the tracking may be imperfect and additional image processing may be required to register two infrared images of the subject prior to forming the difference image. In addition, as shown in FIG. 5, the size and/or aspect of a subject may change during the time interval between the capture of first and second infrared images. The size of the subject image may change simply because the range to the subject changes, for example because the subject is traveling directly towards the active infrared sensor system.

Image processing techniques may be applied to one or both of the first and second images to compensate, to at least some extent, for subject motion prior to forming the difference between the two images. For example, tracking errors may be compensated, at least partially, by translating one image with respect to the other such that silhouettes of the subjects in each image are superimposed to the extent possible. For further example, changes in the size of the subject may be compensated, at least partially, by scaling or zooming one image with respect to the other such that silhouettes of the subjects in each image are superimposed to the extent possible.

Figure 6:
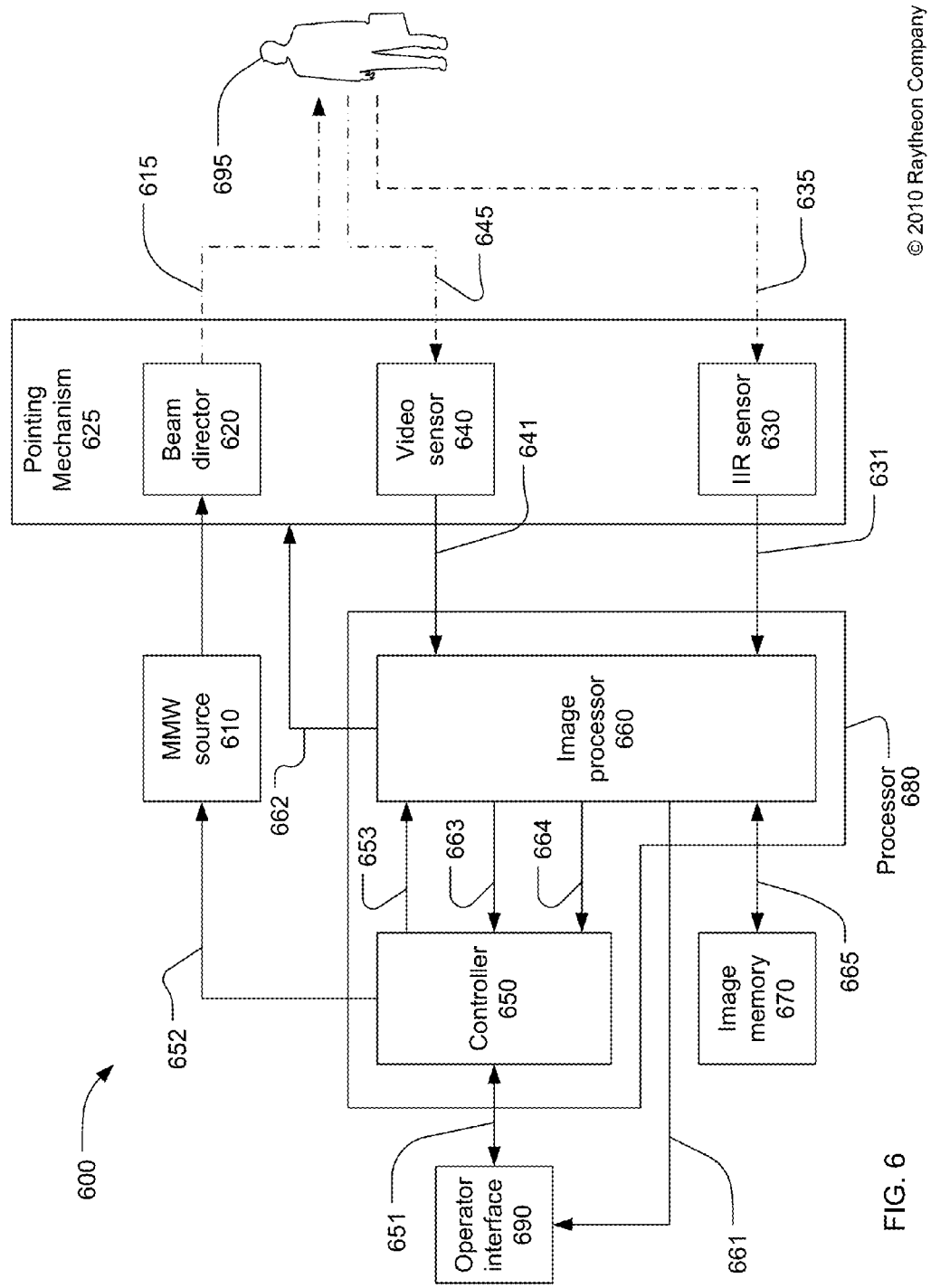
FIG. 6 is a block diagram of an active infrared concealed object detection system.

Referring now to FIG. 6, an active infrared sensor system 600 for detecting concealed objects may include a millimeter wave energy source 610 and a beam director 620 to form millimeter wave energy from the source 610 into an illumination beam 615. The active infrared sensor system 600 may include an imaging infrared sensor 630 and, optionally, a video sensor 640. The active infrared sensor system 600 may include a processor 680 which, for purposes of discussion, may be divided into an image processor 660 and a controller 650 functional elements.

The millimeter wave energy source 610 may provide millimeter wave energy at a predetermined fixed frequency. The millimeter wave energy source 610 may provide millimeter wave energy that steps or sweeps between multiple frequencies. The use of a stepped or swept frequency source may avoid or minimize exciting resonance in metal objects that may be carried by a subject. The millimeter wave energy source 610 may operate in one or more of the known millimeter wave bands with relatively low atmospheric absorption, such as the Ku band, the K band, the Ka band, the V-band, or the W-band.

The beam director 620 may include one or more reflective, refractive, or diffractive elements. The beam director 620 may include, for example, a primary reflector 122 and a secondary reflector 124 as shown in FIG. 1. For a given physical size of the beam director 620, operation at a shorter wavelength may provide a smaller illumination spot size. For example, the millimeter wave energy source 610 may operate in the W-band at a frequency of about 95 GHz. Illumination with W-band radiation is believed to have no long-term deleterious effects on humans, but may cause discomfort if the illumination power level and/or duration are too high.

All or portions of the beam director 620 may be mounted on a pointing mechanism 625 that allows the illumination beam 615 to be directed to the subject 695. The pointing mechanism 625 may be a mechanical apparatus, such as a two-axis gimbal, effective to adjust the direction of the illumination beam in azimuth and elevation. The pointing mechanism 625 may move all or potions of the beam director in order to direct the illumination beam to the subject 695. The millimeter wave energy source 610 may also be mounted on the pointing mechanism 625 such that the source moves with the beam director. When the source 610 is not mounted on the pointing mechanism 625, millimeter wave energy may be coupled from the source 610 to the beam director 620 through a waveguide or other device that accommodates movements of the beam director 620.

The imaging infrared sensor 630 may receive infrared radiation 635 from a scene including a subject 695 and may generate electronic signals 631 representative of the scene at a specific instant in time. In this patent, the term "signals" encompasses analog signals, digital signals, digital data, commands, instructions, packets, and other communications between the functional components of the active infrared sensor system 600. The imaging infrared sensor may include an imaging optical system to form an image of the scene on at least one infrared focal plane array detector and associated electronics. Multiple focal plane array detectors may be used for different infrared wavelength bands. The electronic signals 631 representing the scene may be processed by the image processor 660 and may be stored in digital format in an image memory 670. The imaging infrared sensor 630 may capture images using a single infrared wavelength band which may be, for example, 1.1-2.0 microns, 1.5-2.5 microns, 3-5 microns, 8-12 microns, or some other wavelength band. The imaging infrared sensor 630 may capture separate images in different wavelength bands. The imaging infrared sensor 630 may include two or more imaging sensors which capture images in respective wavelength bands.

The imaging infrared sensor 630 may be mounted on the pointing mechanism 625 used to point the illumination beam 615. Alternatively, the imaging infrared sensor 630 may be mounted on a physically separate pointing mechanism (not shown).

The video sensor 640 may receive visible light from the scene including the subject 695 and may provide video signals 641 representative of visible-light images of the scene. The video sensor 640 may include an imaging optical system to form an image of the scene on one or more visible-light focal plane array detectors, such as charge-coupled device detectors, and associated electronics. The video signals 641 may be processed by the image processor 660 and may be stored in the image memory 670. The video sensor 640 may be mounted on the pointing mechanism 625, or on physically separate pointing mechanism (not shown).

The pointing mechanism 625 may cause the illumination beam 615, the imaging infrared sensor 630, and the video sensor 640 to track the subject 695 in response to signals 662 from the image processor 660. When multiple pointing mechanisms are used to point the beam director 620 and the sensors 630, 640, all of the pointing mechanisms may track the subject in response to signals from the image processor 660. The image processor 660 may process image signals 631, 641 from the imaging infrared sensor 630 and/or the video sensor 640 and may control the pointing mechanism 625 such that the subject 695 remains relatively stationary with the image frame. The image processor 660 may control the pointing mechanism 625 such that the subject 695 remains centered with the image frame.

The image processor 660, which will be discussed in additional detail subsequently, may receive real-time images 631, 641 from the imaging infrared sensor 630 and the video sensor 640. The image processor may store some of all of the images in the image memory 670. Among other functions, the image processor 660 may generate processed images 661 for display to an operator through an operator interface 690. The image processor 660 may also generate signals 662 to cause the pointing mechanism 625 to acquire and track the subject 695.

The operator interface 690 may include one or more display devices and one or more input devices. The operator interface 690 may also interface with other equipment in addition to the active infrared imaging system 600. For example, the operator interface 690 may display images from a wide field of view subject acquisition sensor (not shown) such as a video camera and/or imaging infrared sensor. The operator interface may include a pointing device, such as a mouse or joystick, with which an operator may designate a specific subject within an image from the acquisition sensor. The designated subject may then be inspected for concealed objects using the active infrared imaging system 600.

The controller 650 may coordinate and control the operation of the other functional components of the active infrared sensor system 600. The controller 650 may be coupled to the operator interface 690. The controller may receive signals 651 from the operator interface 690 to designate a specific subject. In response to receiving signals 651 from the operator interface 690 designating a specific subject, the controller 650 may send signals 653 to the image processor 660. The signals 653 may include instructions for the image processor 660 to cause the pointing mechanism 625 to center the field-of-view of the imaging infrared sensor 630 and the video sensor 640 on the designated subject 695. The signals 653 may also instruct the image processor 660 to start and stop tracking the subject 695 and to start and stop acquiring and processing images of the subject 695. The controller 650 may also send signals 652 to the millimeter wave source 610 to turn the illumination beam 615 on and off. The controller may receive a signal from the image processor 660 to indicating when tracking is established. The controller 650 may also provide instructions to the image processor 660 regarding the type of processes to be performed and/or display presentations to be generated.

The controller 650 may receive a variety of signals from the image processor 660. The controller may receive signals 663 indicating that a potential concealed object has been automatically detected. The controller 650 may also receive signals 664 from the image processor 660 indicating a current highest temperature change of the subject caused by the illumination beam 615. The "current highest temperature change" is the real-time temperature change, relative to the subject temperature prior to illumination with the millimeter wave beam, of the point of the subject that has the largest temperature increase induced by radiation with the millimeter wave beam. The signals 664 may also indicate a temperature change rate at the point of the subject that has the largest temperature increase. In response to the signals 664 from the image processor 660, the controller may send signals to the millimeter wave source 610 to control the power level of the illumination beam 615 and/or to turn off the illumination beam 615.

For example, when the maximum temperature change rate is below a predetermined minimum rate, the controller 650 may cause the millimeter wave source 610 to increase the power of the illumination beam 615. When the maximum temperature change rate is above a predetermined maximum rate, the controller 650 may cause the millimeter wave source 610 to decrease the power of the illumination beam 615.

When the instant highest temperature change equals or exceeds a predetermined temperature change limit, the controller may cause a set of subject images to be captured and stored in the image memory 635 and then instruct the millimeter wave source 610 to turn off the illumination beam 615.

The feedback of the instant highest temperature change and the temperature change rate from the imaging infrared sensor 630 via the image processor 660 and the controller 650 to the millimeter wave source 610 may provide closed loop control of the millimeter wave illumination energy delivered to the subject 695. Closed loop control may reduce the possibility of failing to detect a concealed object due to insufficient illumination of the subject. Closed loop control may also reduce the possibility of causing physical discomfort to the subject due to excessive illumination. Closed loop control may also allow the imaging infrared sensor system 600 to operate covertly such that the subject is not made aware that they have been screened for concealed objects.

The imaging infrared sensor system 600 may be operable in both a covert mode and an aggressive mode with higher illumination energy where the subject may be discomforted but not endangered. The aggressive mode may be used, for example, when a previous inspection of the subject using the convert mode indicated a possibility of a threatening concealed object.

In the covert mode, the controller may operate to increase the illumination beam power if the temperature change rate is below a first minimum rate, to decrease the illumination beam power if the temperature change rate is above a first maximum rate, and to capture the second set of images when the instant maximum temperature change is at least a first temperature change limit. The first minimum rate, the first maximum rate, and the first temperature change limit may be set such that the heating from the millimeter wave beam is imperceptible or barely perceptible, such that the subject is not made aware that they are being screened for a concealed object.

In the aggressive mode, the controller may operate to increase the illumination beam power if the temperature change rate is below a second minimum rate greater than the first minimum change rate, to decrease the illumination beam power if the temperature change rate is above a second maximum rate greater than the first maximum change rate, and to capture the second set of images when the instant maximum temperature change is at least a second temperature change limit greater than the first temperature change limit. The second minimum rate, the second maximum rate, and the second temperature change limit may be set such that the heating from the millimeter wave beam may be perceptible but does not cause discomfort to the subject.

When the active infrared imaging system is hand-held, the functions of the pointing mechanism 625 and a portion of the functions of the controller 650 may be performed by an operator.

The division of the processor 680 into image processor 660 and controller 650 functional components does not imply a corresponding division into physical components or units. All or portions of the image processor 660 and the controller 650 may be implemented in common hardware which may include one or more of general-purpose processors such as microcomputers, signal processors, application specific integrated circuits, programmable gate arrays or logic arrays, and other analog and/or digital circuits. All or portions of the image processor 660 and the controller 650 may be implemented by software and/or firmware executed by one or more processors.

Figure 7:
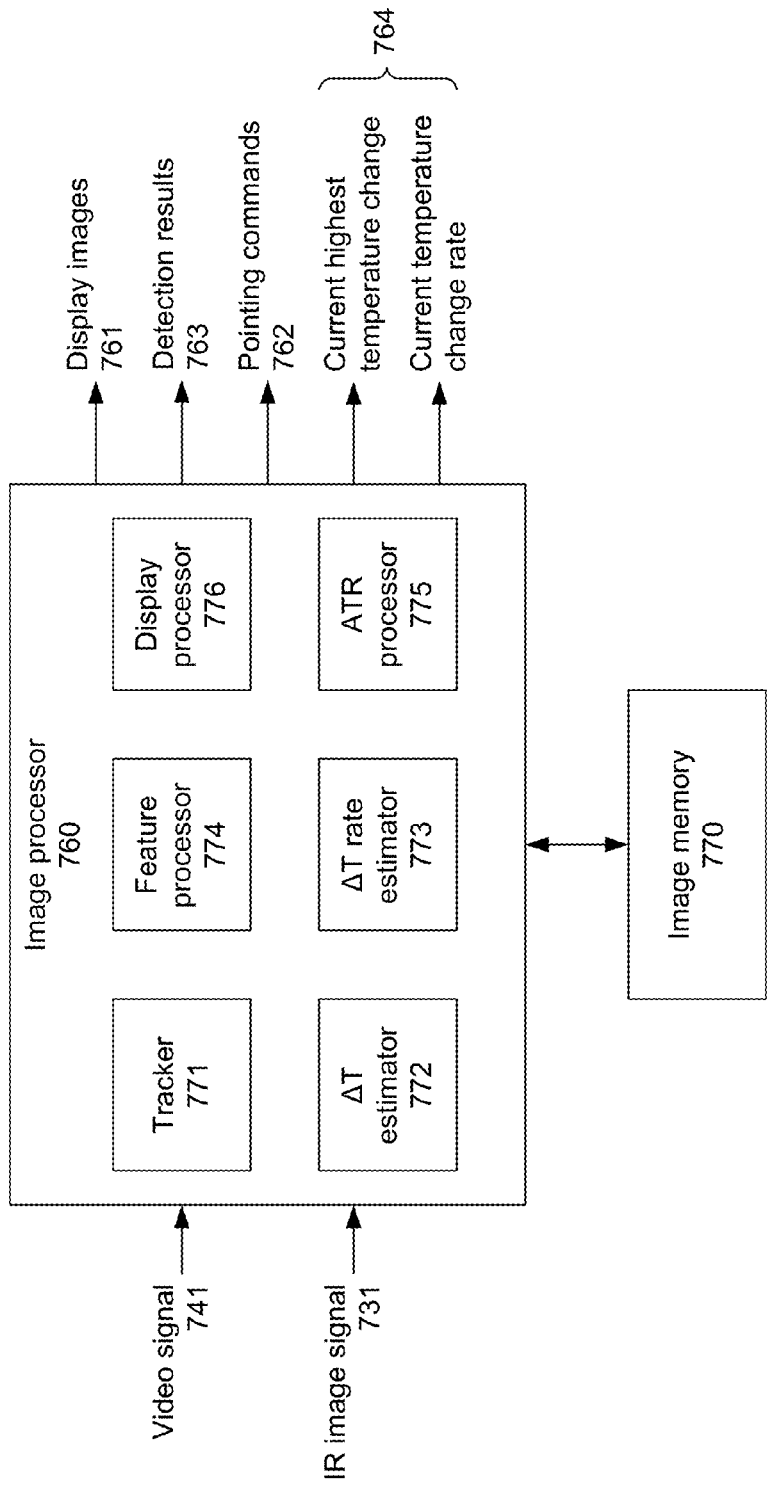
FIG. 7 is a block diagram of an image processor.

Referring now to FIG. 7, an image processor 760, which may be the image processor 660, may be divided, for ease of discussion, into a plurality of functional units including some or all of a tracker 771, a temperature change ($\Delta T$) estimator 772, a temperature change rate estimator 773, a feature processor 774, a display processor 776, and an automatic target recognition (ATR) processor 775. Dividing the image processor into functional units for ease of discussion does not imply a corresponding physical structure or functional independence. All or portions of the functional units 771-776 may share common hardware and may be implemented by software executed by one or more common processors. Further, each of the functional units 771-776 may operate concurrently and/or consecutively with other functional units of the image processor. Each of the functional units 771-776 may interact with and depend upon other functions units. Each of the functional units 771-776 may store images or image sets in an image memory 770 and may retrieve images or image sets from the image memory 770.

The tracker 771 may receive an infrared image signal 731 from an imaging infrared sensor, such as the imaging infrared sensor 630, and/or a video signal 741 from a video sensor, such as the video sensor 640. The tracker 771 may provide commands 762 to a pointing mechanism to orient the imaging infrared sensor and the video sensor such that a designated subject remains relatively fixed in the center of each image frame.

The tracker 771 may first estimate the extent of the subject, for example by extracting a silhouette of the subject, within each time-sequential image frame. The tracker 771 may further determine a point within the extent of the subject, such as a centroid, to remain stationary within consecutive image frames. The tracker 771 may then compare the location of the subject centroid within each new image frame with the subject centroid location in the previous video frame or with an anticipated location of the subject centroid (for example as provided by a Kalman filter) and determine a tracking error. The tracker 771 may then generate commands 762 to a pointing mechanism to correct the tracking error.

In conjunction with tracking the subject within time-sequential images, the tracker 771 may also estimate an orientation or pose of the subject. Methods for identifying the pose of a person within an image have been developed for applications in robotics, machine vision, and cinematic special effects. The tracker 771 may employ one or more known techniques, for estimating the pose of the subject. For example, skeletal joint locations may be estimated from the subject motion in a sequence of image frames, and a three-dimensional model of the subject may be developed based on the estimated joint locations.

The temperature change ($\Delta T$) estimator 772 may estimate a temperature change induced in the subject due to illumination with millimeter wave energy. The temperature change estimator 772 may store an initial image or set of images of the subject in the image memory 770 prior to illumination with the millimeter wave energy. The temperature estimator 772 may estimate the temperature change across the subject from the differences between current infrared images of the subject and the stored initial image or image set.

In the case where the subject and the active infrared sensor system are known to be stationary while being illuminated with millimeter wave energy, the temperature change estimator 772 may simply subtract the stored initial infrared image from the current infrared image to estimate the temperature change across the subject. When the subject is moving, the temperature change estimator 772 may rely upon the tracker 771 to provide data indicating the extent and/or orientation of the subject within each successive image frame. For example, the tracker 771 may provide data defining a silhouette of the subject within each image frame and/or data defining a pose of the subject within each image frame, and the temperature change estimator 772 may estimate a temperature change for image points within the silhouette. The temperature change estimator 772 may also compensate for relative changes in position or pose of the subject between the current image frame and the stored initial image while estimating the temperature change. The temperature estimator 772 may use spatial filtering (for example, averaging pixels within an image) and temporal filtering (for example, averaging time-sequential images) if needed to minimize the effects of noise in the infrared images.

An output of the temperature estimator 772 may be, for example, a temperature change image in which the local temperature change is mapped onto a two-dimensional model of the subject. The temperature estimator 772 may also output a signal indicating the current, or real-time, largest temperature change of any point within the subject extent. The signal indicating the current largest temperature change may be used to control the duration for which the subject is illuminated with millimeter wave energy.

The temperature rate estimator 773 may generate a signal indicating a temperature change rate of the temperature of the point within the subject experiencing the current highest temperature change. The temperature change rate may be the derivative with respect to time of the current highest temperature change. The signal indicating the temperature change rate may be used to control the millimeter wave illumination power.

The feature processor 774 may identify features and objects within infrared images. In particular, the feature processor may identify non-threatening exposed or concealed objects such as buttons, belt buckles, keys, coins, and other objects. The feature processor may identify such objects based on object size and shape, and based on object position within the extent of the subject. For example, a cluster of round objects located alongside a male subject's thigh may be reasonably classified as coins in the subject's pants pocket. A similar cluster of round objects elsewhere on the subject may be suspicious.

The ATR processor 775 may analyze infrared images and, in particular, temperature difference images generated by the temperature change estimator 772 to tentatively identify threatening concealed objects. The ATR processor may identify potentially threatening concealed objects based on the objects size, shape, and location on the subject. The ATR processor may identify concealed objects using techniques similar to techniques developed to recognize and identify targets in infrared images. For example, the ATR processor may compare a portion of a temperature distribution image with a series of templates of anticipated concealed objects such as improvised explosive devices and weapons. Further, the ATR processor may extract features of a suspicious object, such as the length, width, relative infrared emissivity, and position on the subject, and compare the extracted features to a database of anticipated concealed objects. The ATR processor 775 may output detection results 663 including data indicative of the type and position of an identified concealed object, and may provide the same or similar data to the display processor 776 for use in generating display images.

The display processor 776 may generate one or more display images 761 to be viewed by an operator. The display processor 776 may generate display images based on current infrared and video images, stored infrared and video images, and data from other processing units including the temperature change estimator 772, the feature processor 774, and the ATR processor 775. The display processor 776 may generate display images based on combinations of data and images from two or more sources. For example, a temperature change distribution may be superimposed on a video image of the subject. For further example, a subject silhouette extracted from a video image may be superimposed on an infrared image or temperature change distribution.

The display processor 776 may employ known image enhancement techniques such as contrast enhancement, gamma correction, edge sharpening, and application of pseudo coloration. Display images generated by the display processor 776 may incorporate graphical information. For example, graphical information may be added to display images to designate and/or describe objects recognized by the feature processor 774 and/or potentially threatening objects identified by the ATR processor 775.

The display processor 776 may be coupled to an operator interface, such as the operator interface 690, to allow an operator to select alternative display formats and to allow the operator to customize display images to at least some extent. For example, an operator may be allowed to control the type and degree of pseudo color or other image enhancements applied to an image. For further example, the operator may be given an option to remove non-threatening objects identified by the feature processor 774 from a displayed image. Additionally, the operator may be given an option to confirm or not confirm tentative object identifications made by the feature processor and/or the ATR processor 775.

Description of Processes

Figure 8:
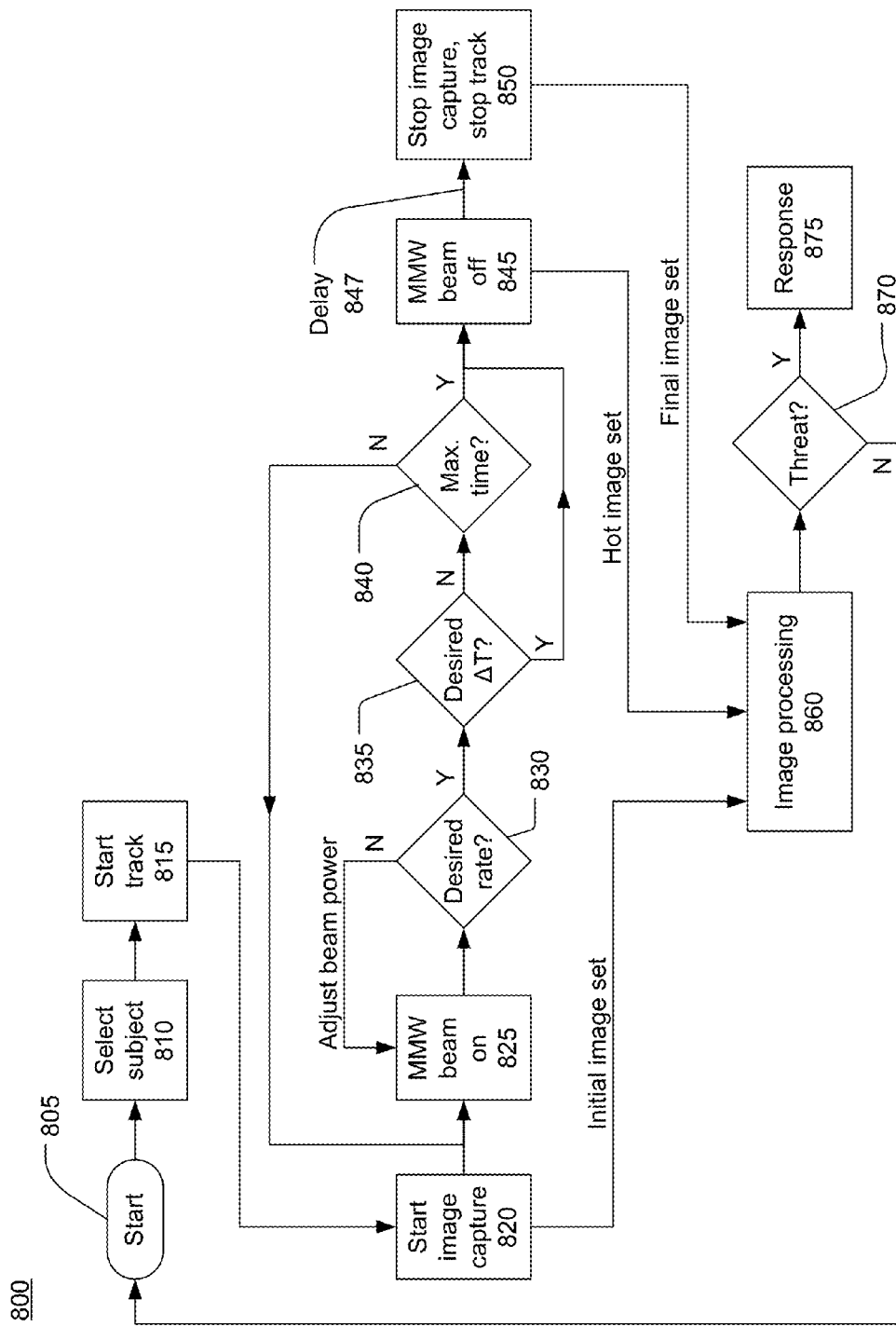
FIG. 8 is a flow chart of a process for detecting a concealed object.

Referring now to FIG. 8, a process 800 for detecting a concealed object may start at 805. The process 800 may be performed using a millimeter wave enhanced infrared sensor such as the sensor 600. The process 800 may be cyclic in nature and may be repeated as needed to screen a plurality of potential object-carrying subjects. The process 800 may not have a specific finish, but may be suspended temporarily when there are no new subjects to screen.

At 810, a subject, in the form of a person who may be carrying a concealed object, may be selected. The subject may be selected by an operator who may, for example, designate the subject using a cursor on a display screen or in some other manner. The subject may be selected automatically. In the case where the millimeter enhanced infrared sensor is hand-held, the subject may be selected by virtue of the operator pointing the sensor such that the subject is with a field of view of the sensor.

At 815, the millimeter wave enhanced infrared sensor may start tracking the subject. The subject may be tracked using conventional techniques for subject tracking. For example, a tracking processor may analyze an image from either an infrared or video sensor and control a pointing mechanism, for example a two-axis gimbal, to orient the sensor such that the subject remains at the center of the image.

At 820, an initial image set may be captured and stored. The initial image set may include at least one infrared image of the subject captured by an infrared sensor such as the sensor 630. The initial image set may include multiple infrared images of the subject captured in different infrared wavelength bands. The initial image set may also include a video image of the subject captured by a video sensor such as the video sensor 640. The initial image set may include a plurality of time-sequential infrared and/or video images.

At 825, the subject may be illuminated by a beam of millimeter wave energy from a millimeter wave energy source such as the source 610. The millimeter wave beam may track the subject such that the subject is illuminated for an extended time period. The tracking processor and gimbal or other device used to track the subject with the infrared sensor at 815 may also cause the beam of millimeter wave energy to track the subject. The infrared sensor may continue to track the subject at 825. In the case where the millimeter enhanced infrared sensor is hand-held, the millimeter wave beam and the imaging infrared sensor may track the subject by virtue of the operator pointing the millimeter enhanced infrared sensor such that the subject remains with the field of view of the sensor.

The illumination of the subject with millimeter wave energy may cause the temperature of all or portions of the subject to increasing due to absorption of energy from the millimeter wave beam. At 830, a determination may be made if a highest temperature change rate across the subject is within a desired operating range. In this context, the phrase "across the subject" means "of any point within the extent of the subject visible in the infrared image". The highest temperature change rate across the subject is the rate of temperature change at the point within the visible extent of the subject where the temperature is changing the fastest. If the highest temperature change rate is not within the desired range, the millimeter wave beam power may be adjusted. For example, if the temperature change rate is less than a predetermined minimum rate, the millimeter wave beam power may be increased. If the temperature change rate is greater than a predetermined maximum rate, the millimeter wave beam power may be decreased. Adjusting the millimeter wave beam power in response to the highest temperature change rate may allow compensation for atmospheric transmission effects such as absorption due to humidity or precipitation.

At 835, a determination may be made if the millimeter wave illumination has caused at least some portion of the subject to experience a predetermined temperature change $\Delta T$. The highest temperature change across the subject may be estimated by comparing one or more current infrared images with corresponding infrared images of the initial image set previously captured and stored at 820. When a determination is made at 835 that the predetermined temperature increase has not occurred, a determination may be made at 840 if the subject has been illuminated for a predetermined maximum illumination time. If the predetermined temperature increase has not occurred and the predetermined maximum illumination time has not been exceeded, the illumination and tracking at 825 may continue.

When a determination is made at 835 that the predetermined temperature increase has occurred, or a determination is made at 840 that the maximum illumination time has been exceeded, the millimeter wave illumination may be discontinued at 845. A "hot" image set may be stored at approximately the same time as discontinuing the millimeter wave illumination, which is to say that the hot image set may be stored immediately before, immediately after, or concurrently with turning the millimeter wave illumination off at 845. The term "hot" is used figuratively. The difference in subject temperature between the "hot" image set and the initial image set may be only a fraction of a degree due to heating by the millimeter wave beam. The hot image set may include the same number and type of images as the first image set previously captured at 820.

After the millimeter wave illumination is discontinued at 845, the infrared sensor may continue to track the subject for an additional predetermined time delay period 847. After the additional time period has expired, a final image set may be captured at 850 and the tracking of the subject may be discontinued. Capturing additional images after the millimeter wave illumination is discontinued may allow detection of a concealed object based on the rate at which the concealed object cools.

The initial, hot, and final image sets captured at 820, 845, and 850, respectively, may be captured using sensors that continuously track the subject. Additional image sets may be stored intermediate to the initial, hot, and final image sets. For example, all of the images captured by the imaging infrared sensor and/or video sensor from 820 to 850 may be stored. Thus the primary movement of the subject with respect to the sensors may be compensated to a large extent such that the subject may be positioned generally at the center of each captured image. However, the tracking may be imperfect, particularly if the imaging infrared sensor is hand-held. Thus simply tracking the subject may not compensate for changes in the subject's posture, aspect ratio, or size (for example, due to changing range between the sensors and the subject). Thus the initial, hot, and final image sets and additional image sets may be processed at 860 to compensate, at least in part, for relative motion of the subject between the three image sets.

At 860, one of the stored image sets may be selected as a reference and the other images may be processed to compensate for relative motion with respect to the reference image set. When the image sets include both infrared and video images, only the infrared images may be processed at 860 for motion compensation. The processing of the infrared images may utilise information extracted from the video images.

Known techniques, including techniques developed for use in cinematography special effects, may be use to compensate for motion of a subject or person between successive images. For example, a first silhouette of the subject may be extracted from the initial image set acquired at 820 and a second silhouette of the subject may be extracted from the hot image set acquired at 840. The images of the hot image set may then be subjected to distortion to cause the second silhouette to overlay the first silhouette to the extent possible. Similarly, the first and second silhouettes may be extracted from video first and second video images. The second video image may then be subjected to distortion to cause the second silhouette to overlay the first silhouette to the extent possible, and an equivalent distortion may be applied to the second infrared image.

For further example, a first pose, or orientation, of the subject may be extracted from the initial image set acquired at 820 and a second pose of the subject may be extracted from the hot image set acquired at 840. An initial temperature distribution across the subject may be estimated from the initial image set. The initial temperature distribution may be mapped to a three-dimensional model of the subject based on the first pose. Similarly, a hot temperature distribution across the subject may be estimated from the hot image set and mapped to a three-dimensional model of the subject based on the second pose. The model of the subject and the associated initial temperature distribution may then be reoriented and distorted to match the second pose. The reoriented/distorted initial temperature distribution and the hot temperature distribution may then be compared to determine a temperature change distribution across the subject. In the case where the subject remains relatively stationary, a temperature change distribution may be determined by subtracting, or otherwise comparing, an initial infrared image from a hot infrared image, as shown in the example of FIG. 2.

In some circumstances, such as a subject turning completely around while being tracked and illuminated, it may not be possible to compensate for the subject motion. In these circumstances, either the motion compensation processing or the operator may determine that detection of a concealed object may not be possible unless a new set of images are acquired.

The image processing at 860 may include analysis of the temperature change distribution across the subject to automatically recognize potentially threatening concealed objects and/or to enhance images displayed to the operator to improve the operator's ability to recognize potentially threatening concealed objects. Automatic target recognition processing may include, for example, extraction of the size, shape, and location information of anomalous objects and comparison with expected characteristics of weapons, improvised explosive devices, and other threats. The image processing performed at 860 may also include recognition and removal of routine concealed objects such buttons, belt buckles, keys, and coins.

The image processing at 860 may also include generating one or more displayed images using known image enhancement techniques such as contrast enhancement, gamma correction, edge sharpening, and application of pseudo coloration. Displayed images generated at 860 may combine data from video images, infrared images, and images derived from processing results such as temperature change distributions. For example, a temperature change distribution may be superimposed on a video image of the subject. For further example, a subject silhouette extracted from a video image may be superimposed on an infrared image or temperature change distribution.

At 870, a determination may be made if a subject is carrying a potentially threatening concealed object. The determination may be made, for example, fully automatically, or by an operator viewing display images generated at 860, or by an automatic recommendation with operator confirmation. When a determination is made at 870 that a potential threat has been detected, some form of response may be made at 875. The response may be or include, for example, an alarm, a deterrent action such as illuminating the subject with a higher power millimeter wave beam, or an action undertaken by security personnel.

When a determination is made at 870 that a subject is not carrying a potentially threatening concealed object, a next subject may be selected at 810. The process from 810 to 870 may be repeated cyclically as necessary to screen all potential subjects.

Figure 9:
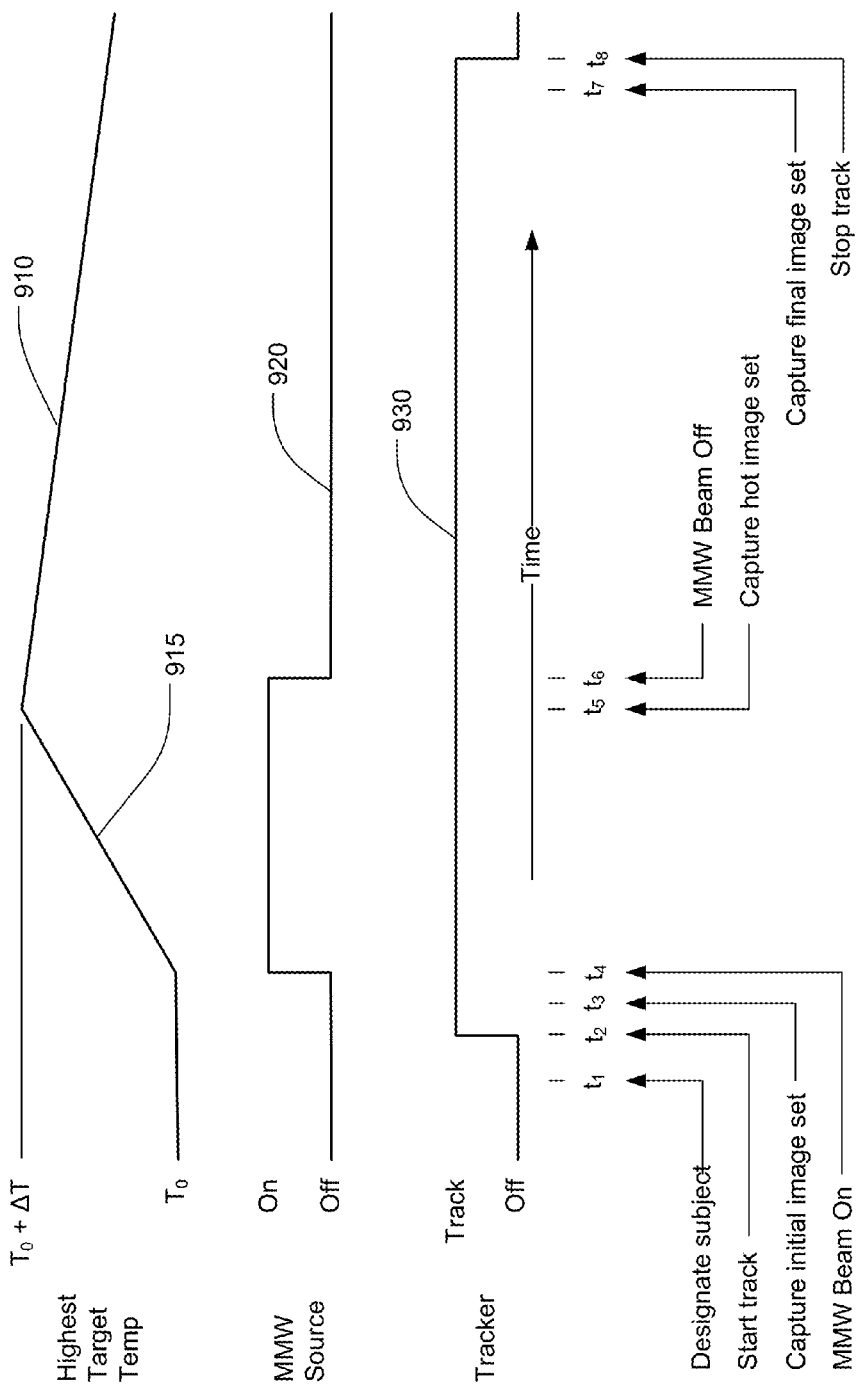
FIG. 9 is a timing diagram for detecting a concealed object.

FIG. 9 is a timing diagram of the process 800 for detecting concealed objects with a millimeter wave enhanced infrared sensor such as the sensor 600. The line 910 plots a highest temperature across a subject as estimated from infrared images of the subject. The line 920 plots the "on" and "off" states of a millimeter wave illumination source. The line 930 plots the "track" and "off" states of a tracker and pointing system that causes both an infrared image sensor and the millimeter wave illumination source to track a moving subject.

At time t1, a subject may be designated (810 in FIG. 8). At time t2, the tracking and pointing system may direct the infrared image sensor and the millimeter wave illumination source at the subject and begin tracking the subject (815 in FIG. 8). The delay between time t1 and time t2 may depend primarily on ability of the pointing system to change directions. The delay between time t1 and t2 may be nearly instantaneous, or may be up to several seconds.

At time t3, an initial set of images of the subject may be captured (820 in FIG. 8). Time t3 may be immediately after subject tracking is started at time t2. At time t4, the millimeter wave source may be turned "on" to illuminate the subject with millimeter wave energy (825 in FIG. 8). Time t4 may be immediately after the first image set is captured at time t3.

After time t4, a rate of change 915 of the highest subject temperature may be determined, and the millimeter wave illumination power may be adjusted if the rate of change is not within a predetermined range (830 in FIG. 8). For example, the millimeter wave illumination power may be increased if the rate of change 915 is less than a predetermined minimum rate. The millimeter wave illumination power may be increased if the rate of change 915 is more than a predetermined maximum rate.

At time t6, the highest temperature change across the subject 910 may reach a predetermined temperate change limit ΔT, and the millimeter wave illumination may be discontinued (845 in FIG. 8). At time t5, which may be approximate the same as time t6, a hot set of images of the subject may be captured.

At time t7, a final image set of the subject may be capture and tracking of the subject may be discontinued at time t8 (850 in FIG. 8). Time t8 may be coincident with or immediately after time t7. There may be a predetermined delay interval between time t6 and time t7.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional or fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An active infrared sensor apparatus comprising:
    an imaging infrared sensor configured to output time-sequential images of a scene which includes a subject;
    a beam generator configured to generate a millimeter wave energy beam; and
    a processor configured to:
        store a first infrared image of the scene from the imaging infrared sensor in a memory, the first infrared image identifying an initial temperature distribution within the subject prior to illumination of the subject with the millimeter wave energy beam;
        cause the beam generator to illuminate the subject with the millimeter wave energy beam to thereby create an altered temperature distribution within the subject;

obtain a second infrared image of the scene from the imaging infrared sensor, the second infrared image identifying the altered temperature distribution within the subject due to the millimeter wave energy beam;

identify differences between the first and second infrared images to determine how the millimeter wave energy beam changes the temperature distribution within the subject; and cause the beam generator to stop illuminating the subject when a highest temperature change across the subject caused by the millimeter wave energy beam equals or exceeds a predetermined temperature change limit.

2. The apparatus of claim 1, wherein the processor is further configured to store the second infrared image at approximately the same time as causing the beam generator to stop illuminating the subject.

3. The apparatus of claim 2, wherein the processor is further configured to:

determine a highest temperature change rate across the subject;

when the highest temperature change rate is less than a predetermined minimum rate, cause the millimeter wave energy beam's power to increase; and when the highest temperature change rate is greater than a predetermined maximum rate, cause the millimeter wave energy beam's power to decrease.

4. The apparatus of claim 3, wherein:

in a covert mode of operation, the temperature change limit, the minimum rate, and the maximum rate are set to first respective values, and in an aggressive mode of operation, the temperature change limit, the minimum rate, and the maximum rate are set to second respective values, each second respective value greater than the corresponding first respective value.

5. The apparatus of claim 4, wherein:

the first respective values of the temperature change limit, the minimum rate, and the maximum rate are set such that heating caused by the millimeter wave energy beam is at most barely perceptible to the subject, and the second respective values of the temperature change limit, the minimum rate, and the maximum rate are set such that the heating caused by the millimeter wave energy beam is easily perceptible but not discomforting to the subject.

6. The apparatus of claim 1, further comprising a pointing mechanism;

wherein the processor is further configured to control the pointing mechanism to cause the millimeter wave energy beam and the imaging infrared sensor to track the subject from prior to storing the first infrared image until after storing the second infrared image.

7. The apparatus of claim 1, wherein the processor is further configured, after causing the beam generator to stop illuminating the subject, to store a third infrared image of the scene after waiting a predetermined time interval.

8. The apparatus of claim 7, further comprising a pointing mechanism;

wherein the processor is further configured to:

cause the millimeter wave energy beam to track the subject from prior to storing the first infrared image until after storing the second infrared image, and cause the imaging infrared sensor to track the subject from prior to storing the first infrared image until after storing the third infrared image.

9. The apparatus of claim 1, wherein the processor is further configured, when the subject has been illuminated for a predetermined maximum illumination period, to store the second infrared image and cause the beam generator to stop illuminating the subject.

10. A method for capturing infrared images, comprising:

storing a first infrared image of a scene from an imaging infrared sensor, the first infrared image identifying an initial temperature distribution within a subject in the scene prior to illumination of the subject with a millimeter wave energy beam;

illuminating the subject with the millimeter wave energy beam to thereby create an altered temperature distribution within the subject;

obtaining a second infrared image of the scene from the imaging infrared sensor, the second infrared image identifying the altered temperature distribution within the subject due to the millimeter wave energy beam;

identifying differences between the first and second infrared images to determine how the millimeter wave energy beam changes the temperature distribution within the subject; and discontinuing illuminating the subject when a highest temperature change across the subject caused by the millimeter wave energy beam equals or exceeds a predetermined temperature change limit.

11. The method of claim 10, further comprising:

storing the second infrared image at approximately the same time as discontinuing illuminating the subject.

12. The method of claim 11, further comprising:

determining a highest temperature change rate across the subject;

when the highest temperature change rate is less than a minimum rate, increasing the millimeter wave energy beam's power; and when the highest temperature change rate is greater than a maximum rate, decreasing the millimeter wave energy beam's power.

13. The method of claim 12, further comprising:

selecting one of a covert mode or operation and an aggressive mode of operation;

when the covert mode of operation is selected, setting the maximum temperature change limit, the minimum rate, and the minimum rate to respective first values; and when the aggressive mode of operation is selected, setting the maximum temperature change limit, the minimum rate, and the minimum rate to respective second values, each second respective value greater than the corresponding first respective value.

14. The method of claim 13, wherein:

the first respective values of the temperature change limit, the minimum rate, and the maximum rate are set such that heating caused by the millimeter wave energy beam is at most barely perceptible to the subject, and the second respective values of the temperature change limit, the minimum rate, and the maximum rate are set such that the heating caused by the millimeter wave energy beam is easily perceptible but not discomforting to the subject.

15. The method of claim 10, further comprising:

tracking the subject with the millimeter wave energy beam and the imaging infrared sensor from prior to storing the first infrared image until after storing the second infrared image.

16. The method of claim 10, further comprising:

after discontinuing illuminating the subject, storing a third infrared image of the scene after waiting a predetermined time interval.

17. The method of claim 16, further comprising:
tracking the subject with the millimeter wave energy beam from prior to storing the first infrared image until after storing the second infrared image; and
tracking the subject with the imaging infrared sensor from prior to storing the first infrared image until after storing the third infrared image.

18. The method of claim 10, further comprising:
when the subject has been illuminated for a predetermined maximum illumination period, storing the second infrared image and discontinuing illuminating the subject.

19. The apparatus of claim 1, wherein the processor is further configured to automatically recognize the subject as one of a targeted object and a benign object.

20. The method of claim 10, further comprising:
automatically recognizing the subject as one of a targeted object and a benign object.

21. A non-transitory computer readable medium embodying a computer program, the computer program comprising computer readable program code for:

storing a first infrared image of a scene, the first infrared image identifying an initial temperature distribution within a subject in the scene prior to illumination of the subject with a millimeter wave energy beam;

initiating the illumination of the subject with the millimeter wave energy beam to thereby create an altered temperature distribution within the subject;

obtaining a second infrared image of the scene, the second infrared image identifying the altered temperature distribution within the subject due to the millimeter wave energy beam;

identifying differences between the first and second infrared images to determine how the millimeter wave energy beam changes the temperature distribution within the subject; and discontinuing illuminating the subject when a highest temperature change across the subject caused by the millimeter wave energy beam equals or exceeds a predetermined temperature change limit.

* * * * *

UNITED STATES PATENT AND TRADEMARK OFFICE
CERTIFICATE OF CORRECTION

PATENT NO. : 8,896,701 B2  
APPLICATION NO. : 12/711062  
DATED : November 25, 2014  
INVENTOR(S) : Kenneth W. Brown et al.

It is certified that error appears in the above-identified patent and that said Letters Patent is hereby corrected as shown below:

Title Page, item (54) and in the Specification, Column 1, lines 1-4, should read, Title: INFRARED CONCEALED OBJECT DETECTION ENHANCED WITH CLOSED-LOOP CONTROL OF ILLUMINATION BY MMW ENERGY Title Page, item (73), should read, Assignee: RAYTHEON COMPANY Signed and Sealed this  
Thirty-first Day of March, 2015

Michelle K. Lee  
*Director of the United States Patent and Trademark Office*